United States Patent [19]

Mills et al.

[11] Patent Number: 4,461,455

[45] Date of Patent: Jul. 24, 1984

[54] AIRCRAFT ENGINE LIFTING AND POSITIONING APPARATUS

[75] Inventors: Charles J. Mills, Bellevue; Steven E. Tracy, Seattle, both of Wash.

[73] Assignees: The Boeing Company, Seattle, Wash.; Aero-Go, Inc.

[21] Appl. No.: 307,177

[22] Filed: Sep. 30, 1981

[51] Int. Cl.³ ............................................. B60P 1/04
[52] U.S. Cl. ................... 254/3 R; 254/7 R; 254/89 H; 254/92; 254/93 HP; 414/589; 414/590; 180/125
[58] Field of Search ............. 254/2 R, 2 C, 3 R, 3 C, 254/7 R, 7 C, 89 H, 93 HP, 86 R, 92, 100, 101, 133 R, DIG. 4; 269/17, 296; 414/589, 590; 280/43.24, 43.2; 180/125

[56] References Cited

U.S. PATENT DOCUMENTS

| | | | |
|---|---|---|---|
| 537,160 | 4/1895 | King | 51/427 |
| 2,124,726 | 7/1938 | Blum | 254/92 |
| 2,483,176 | 9/1949 | Bishop et al. | 51/427 |
| 2,494,773 | 1/1950 | Mead | 51/427 |
| 2,723,498 | 11/1955 | Hastrup | 51/427 X |
| 2,770,924 | 11/1956 | Mead et al. | 51/427 X |
| 2,846,822 | 8/1958 | Steffen | 51/431 X |
| 3,180,503 | 4/1965 | Shaw | 254/7 C X |
| 3,380,196 | 4/1968 | Mabille | 51/429 X |
| 3,524,556 | 8/1970 | Miller | 414/589 |
| 3,618,297 | 11/1971 | Hamrick | 15/352 X |
| 3,624,967 | 12/1971 | Kamper et al. | 51/427 X |
| 3,925,935 | 12/1975 | Ricklefs | 51/429 X |
| 3,944,094 | 3/1976 | Compton | 254/2 R X |
| 4,232,487 | 11/1980 | Brown | 51/427 X |
| 4,323,141 | 4/1982 | Ragan et al. | 254/93 HP X |

FOREIGN PATENT DOCUMENTS

| | | | |
|---|---|---|---|
| 782892 | 4/1968 | Canada | 180/125 |
| 2024167 | 1/1980 | United Kingdom | 254/93 HP |

Primary Examiner—Frederick R. Schmidt
Assistant Examiner—Steven P. Schad
Attorney, Agent, or Firm—Christensen, O'Connor, Johnson & Kindness

[57] ABSTRACT

A lifting and positioning apparatus particularly suited for use in the installation of wing-mounted airplane engines includes superposed upper and lower load-bearing support platforms that are connected to one another by means of a jack mechanism operable to raise and lower the upper platform while supported by the lower platform. The lower platform includes and is movably supportable on fluid cushion bearings. The upper platform supports a plurality of resilient elastomeric elevator bellows that are positioned and adapted to receive and support a heavy object, such as an aircraft engine, while cushioned against application of excessive lifting force. The bellows are independently inflatable and deflatable to effect raising and lowering of selected portions of the aircraft engine and thereby rotate the engine to desired angular orientations. Alternatively, the bellows may be actuated conjointly to effect uniform vertical raising or lowering of the aircraft engine. In operation, the combination of the fluid cushion bearings supporting the lower platform and the elevator bellows on the upper platform enables rotation of the aircraft engine with three degrees of freedom so as to obtain any desired angular orientation for installation. Once the desired angular orientation is obtained, the engine may be raised vertically, first by the jack mechanisms and then by actuating the elevator bellows in unison. The elastomeric bellows and the fluid cushion bearings limit the amount of force that can be applied to the engine during rotation and lifting. The aircraft engine can thus be raised and positioned with a desired angular orientation for mounting without danger of excessive forces being applied to the various attachment members that connect the engine to the airplane wing.

6 Claims, 6 Drawing Figures

AIRCRAFT ENGINE LIFTING AND POSITIONING APPARATUS

BACKGROUND OF THE INVENTION

This invention is generally related to lifting and hoisting apparatus and, more particularly, apparatus for lifting and positioning aircraft engines during installation.

Wing-mounted engines of large transport airplanes must be periodically removed for servicing and maintenance. Such engines are normally attached to the underside of the airplane wing, or to a pylon depending from the wing, by means of special-purpose attachment assemblies. More specifically, the engine is typically provided with what are known as engine cone bolts, which consist of an upwardly projecting conical member having a threaded stud projecting from its upper end. The upwardly projecting engine cone bolts are received in cooperably shaped, downwardly opening conical bores, which are known as wing-mounting cones and which are formed in structural members of the wing. The threaded studs of the engine cone bolts pass through central apertures in the wing-mounting cones so as to enable the engine to be bolted to the wing, with the conical members of the engine cone bolts and the mating wing-mounting cones operating to distribute stresses and also precisely orient the engine with respect to the wing.

Such an engine is ordinarily installed by lifting it upwardly into position to be secured to the underside of the wing. In doing so, the engine cone bolts must be accurately aligned with and inserted into the corresponding wing-mounting cones. This ordinarily requires that the engine be positioned at a particular angular orientation and lifted directly upwardly while maintained in such orientation so that all of the engine cone bolts and their corresponding wing-mounting cones are brought into alignment and mated simultaneously. Failure to maintain the engine in the proper orientation while raising it into position for mounting can result in damage to the engine cone bolts or the wing-mounting cones. Such damage can arise due to the large mass of the engine, typically on the order of 5000 pounds, and the correspondingly large lifting forces employed, which can fracture or otherwise damage the engine cone bolts or the wing-mounting cones when brought together in imperfect alignment.

Previous methods and apparatus for engine installation have proved unsatisfactory for various reasons. For example, chain hoists have long been used to install airplane engines. Several such hoists are suspended from anchors located on the underside of the airplane wing and are connected to the engine so as to enable the engine to be drawn upwardly into its mounting position. The several hoists are independently operable in order to permit the engine to be brought into its proper angular orientation for mounting. The hoists are usually manually operated in order to prevent excessive and unpredictable force from being applied, such as could be the case with powered chain hoists. One disadvantage of this method of installation is that the number of personnel required makes the process relatively expensive. Also, it is difficult to precisely orchestrate the operation of the several hoists so as to achieve a correct engine orientation and at the same time draw the engine directly upward while so oriented. Further, the method is undesirable from a safety standpoint because the assisting personnel are normally located beneath the overhead suspended engine.

Airplane engines have also been installed with forklifts. This has previously been a common practice in the industry, since the engines are ordinarily supported while removed from the airplane on special-purpose engine dollies that include provisions for lifting with a conventional forklift. Such dollies are designed to support the engine generally in the correct orientation for mounting, so that the engine and dolly can be lifted upwardly as a unit for engine installation with a conventional forklift. Nevertheless, small adjustments to the engine orientation are often required, and such adjustments are difficult or impossible to achieve with a conventional forklift. This problem is exacerbated by the fact that the forklift operator is ordinarily unable to ascertain the upward force exerted by the forklift. Since the weight capacity of a conventional forklift is ordinarily much greater than the weight of an airplane engine, it is an easy matter for the forklift operator to inadvertently raise the engine upwardly against the wing with an excessive amount of force. This can easily result in damage to the attachment members, particularly if excessive upward force is applied while the engine is in an incorrect angular orientation. Such damage has in fact been caused in this manner to essential structural elements of the wing in several instances, and in at least one instance has resulted in catastrophic failure of the engine-mounting pylon during flight. This problem is of particular concern because, in most instances, the forklift operator is unable to determine whether excessive force has been applied, and further because the resulting damage is of a type that is likely to go undetected at the time of engine installation, but which could nevertheless cause catastrophic failure under high load conditions during flight.

Accordingly, it is an object and purpose of the present invention to provide an improved lifting and positioning apparatus for use in the installation of aircraft engines and the like. More particularly, it is an object of the invention to provide a lifting apparatus that is capable of raising an aircraft engine to its mounting position, and which is also capable of providing rotational motion of the engine with three degrees of freedom so as to obtain a desired angular orientation for mounting.

It is a further object of the invention to provide a lifting apparatus for an aircraft engine that is self-limiting in the amount of upward force that may be exerted.

It is yet another object of the invention to provide a lifting apparatus for an aircraft engine that achieves the foregoing objects and purposes and which may also be used in another mode for transportation of an aircraft engine and its associated engine dolly.

SUMMARY OF THE INVENTION

In accordance with the invention, a lifting and positioning apparatus for stress-critical mounting of a heavy object such as an aircraft engine includes superposed upper and lower load-bearing support platforms that are connected by a jack mechanism. The jack mechanism is of any suitable type operable to selectively raise and lower the upper platform while supported by the lower platform. The lower platform is provided with fluid cushion bearings that enable the entire lifting apparatus, including both upper and lower platforms, to be manually moved about on a smooth ground surface on a low-friction film of pressurized fluid. The upper platform, in addition to being elevatable with respect to the lower platform by means of the jack mechanism, supports a resilient lifting means that is adapted to support and raise a heavy object such as an aircraft engine while resiliently cushioned and in all planes yieldable in response to unbalanced mount reaction forces so as to avoid application of excessive stress to any mounting fitting or section. The lifting means includes individual lifting elements that may be selectively actuated to rotate the engine about longitudinal and transverse axes so as to position the engine in a desired angular orientation for mounting. The lifting elements may also be actuated in unison so as to raise the engine directly upward while maintained in a desired orientation. The lifting elements are each resiliently cushioned and yieldable, preferably pneumatically, so as to limit the force applied to the engine during rotation as well as lifting and thereby prevent damage to the engine mounting means during installation.

Preferably, the lifting means comprises a set of pneumatic, elastomeric elevator bellows, which are independently inflatable and deflatable so as to enable the engine to be rotated in two degrees of freedom to a desired orientation. Additionally, the elevator bellows may be pressurized in unison to lift the engine vertically while maintained in a desired orientation, with the lifting force, applied when so lifting the engine, being limited by the pneumatic pressurization as well as the expansibility of the elastomeric elevator bellows.

The engine can be rotated with three degrees of freedom to position it in any desired angular orientation. Rotation of the engine about its longitudinal axis, and rotation of the engine about a transverse horizontal axis, are effected by pressurizing selected ones of the elevator bellows. Rotation of the engine about a vertical axis is effected by rotating the entire lifting apparatus on the air cushion bearings. It will be appreciated that in the former cases the force exerted on the engine is limited to that applied by the pneumatically cushioned elevator bellows, and in the latter case the force exerted on the engine is limited to that which can be manually applied to the apparatus by a person standing on the ground. Thus, it is impossible to exert excessive force on the engine-mounting elements while rotating the engine to a desired angular orientation or while raising the engine to its final mounting position.

In operation, the jack mechanism is used to raise the engine on the upper support platform to within a few inches of the airplane wing. Thereupon the fluid cushion bearings and the pneumatic lifting means are presurized, first to rotate the engine about vertical, longitudinal and transverse axes into the desired orientation, and then to raise it upwardly while so oriented into its final mounting position. The yieldably resilient nature of the lifting means limits the amount of force with which the engine may be lifted upwardly over the last few inches, thereby preventing damage to the engine or wing mounting elements by inadvertent forced misalignment of the engine or through operator error.

In accordance with another aspect of the invention, the upper support platform includes downwardly depending caster wheels, and the jack mechanism is bidirectional so as to enable the lower support platform to be withdrawn upwardly and suspended from the upper platform, with the entire lifting apparatus thus being supported by the caster wheels. This permits the apparatus to be transported over rough surfaces that could not normally accommodate the fluid cushion bearings that movably support the lower platform on the ground for manual positioning of the engine during installation.

These and other aspects of the invention are set forth in the accompanying FIGURES and in the detailed description of a preferred embodiment set forth below.

DETAILED DESCRIPTION OF THE PREFERRED EMBODIMENT

Figure 1:
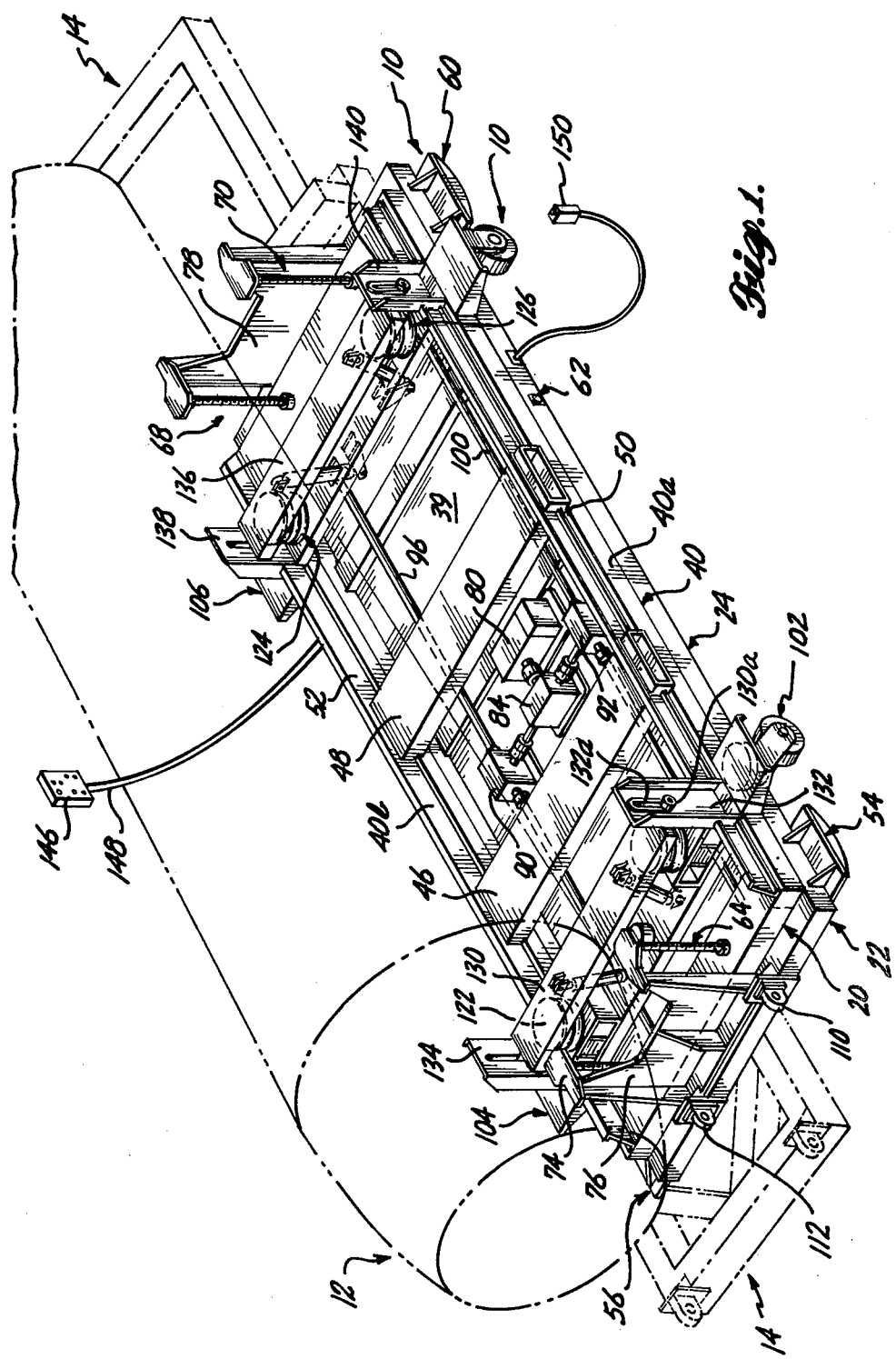
FIG. 1 is an isometric perspective view of a preferred embodiment of the lifting and positioning apparatus of the present invention, with an aircraft engine shown in phantom outline in the position in which it is normally carried.
Figure 4:
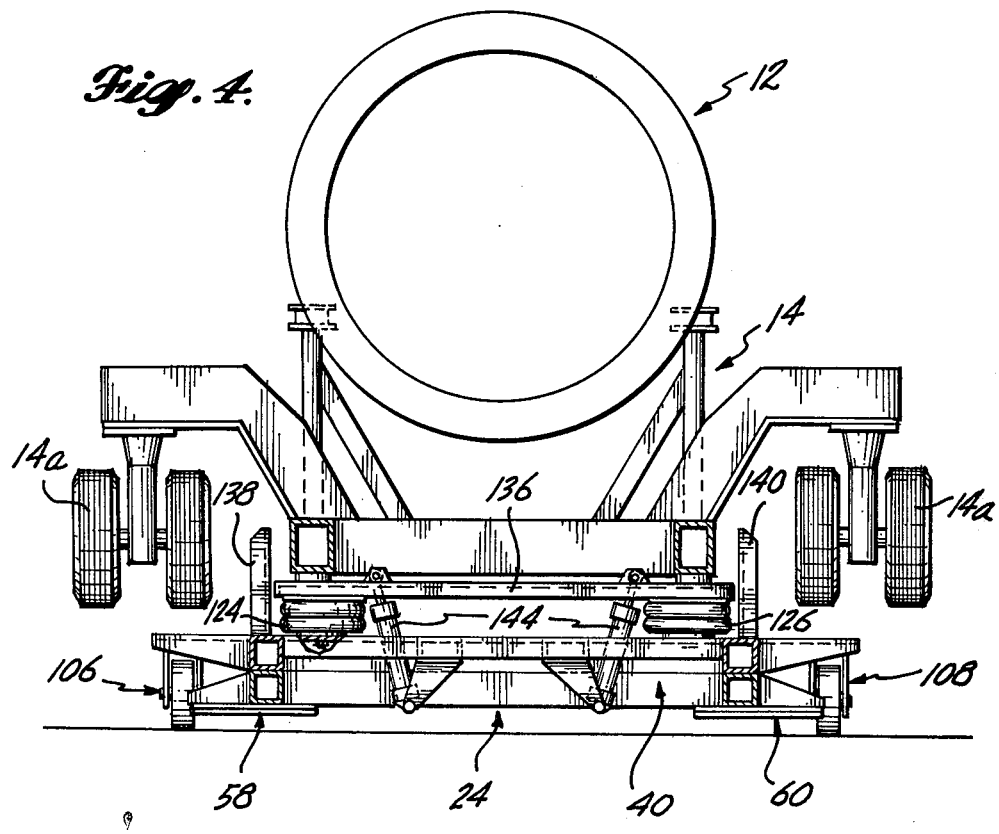
FIG. 4 is a cross-sectional end view of the embodiment shown in FIG. 1, taken along section line 4—4 of FIG. 2.
Figure 5:
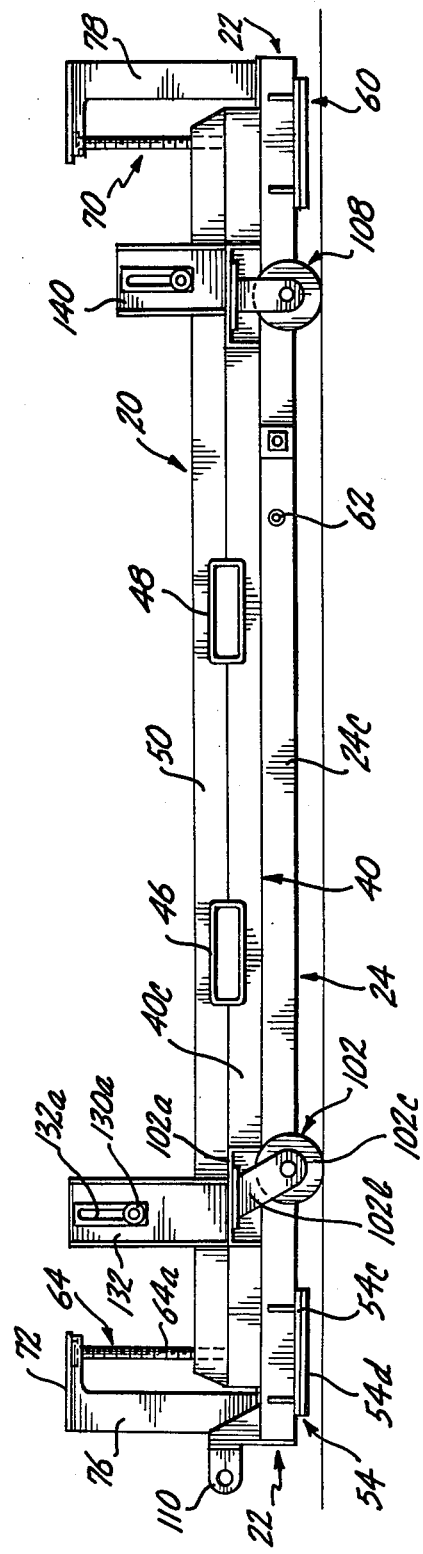
FIG. 5 is a side view of the apparatus of FIG. 1.
Figure 6:
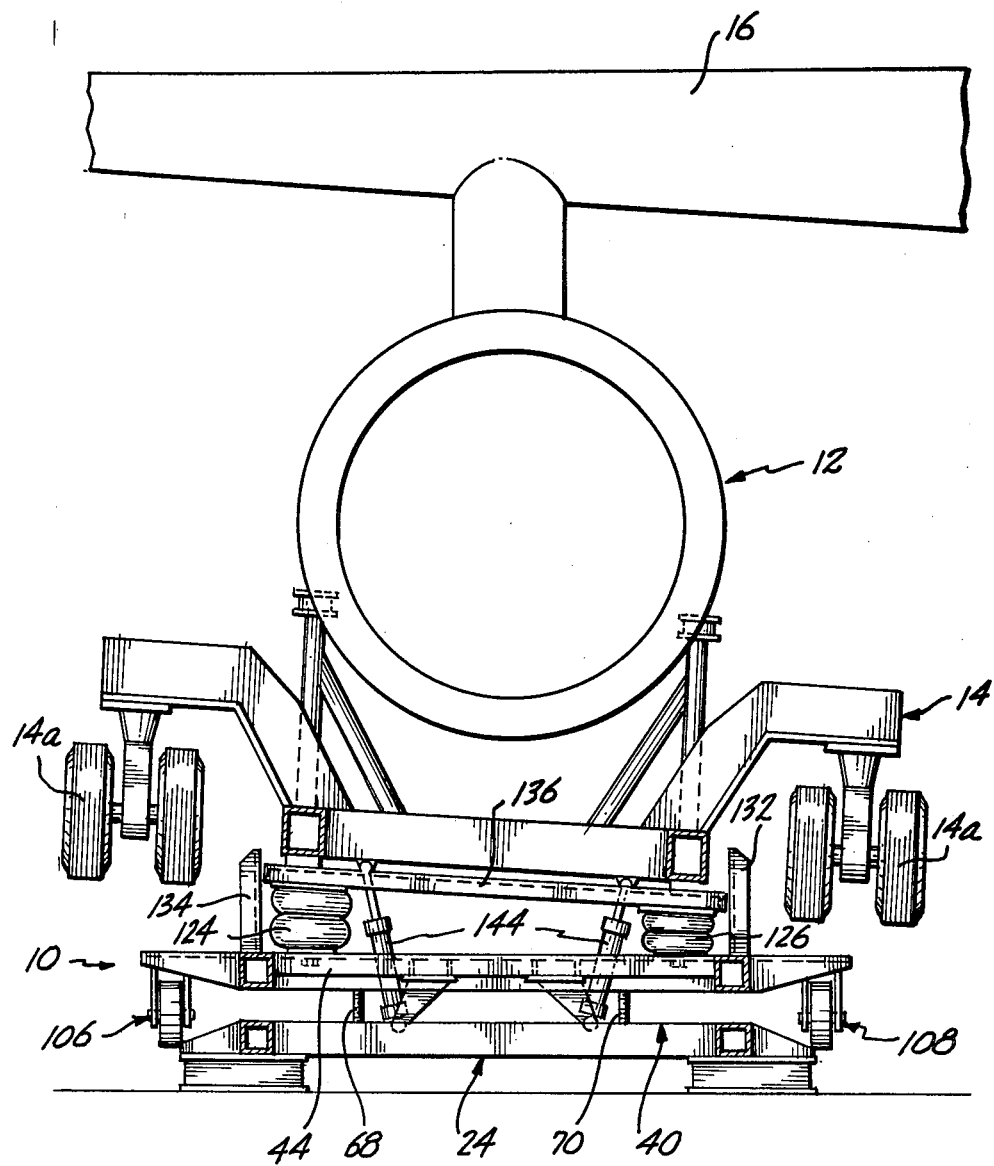
FIG. 6 is an end view in cross section showing the apparatus as it is used to support an aircraft engine for mounting.

FIGS. 1 through 6 illustrate an embodiment of the lifting and positioning apparatus 10 constructed in accordance with the present invention. The lifting apparatus 10 is illustrated in FIGS. 1, 4, and 6 as supporting an aircraft engine 12 and an associated engine dolly 14 having wheels 14a (shown in phantom outline). The engine 12 and dolly 14 form no part of the invention and will not be described further. As illustrated particularly in FIG. 6 and discussed further below, the engine 12 may be positioned in a desired angular orientation and raised upwardly while maintained in such an orientation in order to permit the engine to be attached to an airplane wing 16.

The lifting apparatus 10 generally includes an upper load-bearing support platform 20 that is superposed on a lower load-bearing platform 22. The lower platform 22 includes a rectangular frame 24 formed of steel box beams so as to include forward and rear frame sections 24a and 24b and side frame sections 24c and 24d. The frame 24 is spanned by forward and rear crossbeams 26 and 30 that are located immediately adjacent and parallel to the front and rear frame sections 24a and 24b, respectively. Additionally, the frame 24 includes intermediate crossbeams 32, 34, and 36, and a pair of horizontal mounting plates 38 and 39 that are located between the crossbeams 32 and 34, and 34 and 36, respectively.

The upper platform 20 similarly includes a rectangular steel frame 40 formed of steel box beams and including forward and rear frame sections 40a and 40b and side frame sections 40c and 40d. The frame 40 is somewhat shorter in length than the frame 24, such that the end frame sections 40a and 40b of the upper platform 20 are superposed on the front and rear crossbeams 26 and 30 of the lower platform 22. The frame 40 further includes front and rear crossbeams 42 and 44 that are spaced inwardly from the front and rear end sections 40a and 40b, respectively. Further, the frame 40 includes intermediate reinforcing crossbeams 46 and 48, and a pair of outwardly opening steel channels 50 and 52 mounted edgewise on the upper surfaces of the side frame sections 40c and 40d of the frame 40.

The lower platform 22 includes a set of four air-cushion bearings 54, 56, 58, and 60. The air-cushion bearings 54 and 60 are attached to the underside of the frame 24 at the opposite ends of the side frame section 24c, and the air-cushion bearings 56 and 58 are attached to the underside of the frame 24 at opposite ends of the side frame sections 24d. The air-cushion bearings are substantially identical and will be described further with reference to the exemplary bearing 54. The bearing 54 includes a rigid plate 54a that is attached to the underside of the side frame section 24c and is braced by gussets 54b and 54c. A flexible air-bearing element 54d is affixed to the underside of the rigid plate 54a. The air-bearing elements of the four air-cushion bearings operate in a manner well known in the industry to support the lower frame 22 on a film of pressurized air when pneumatically pressurized. The four air-cushion bearings 56, 58, and are pneumatically actuated by an external source of pressurized air (not shown). Suitable pneumatic tubing connects the air-cushion bearings to a pneumatic coupling 62 located on the side of the frame 24.

The upper and lower platforms 20 and 22 are connected to one another by means of four jack assemblies 64, 66, 68, and 70. The forward jack assemblies 64 and 66 include jackscrews 64a and 66a, respectively, that extend upwardly from the front crossbeam 26. The lower ends of the jackscrews 64a and 66a are mounted in rack-and-pinion gearbox assemblies 64b and 64c, respectively. The upper ends of the jackscrews 64a and 66a are journalled in flange-bearing assemblies affixed to rigid ears 72 and 74. The ears 72 and 74 extend horizontally from an upright bearing bracket 76 which is mounted on the forward frame section 24a of the lower platform 22.

The jackscrews 64a and 66a pass through threaded couplings emplaced in apertures formed in the forward frame section 40a of the upper platform frame 40, such that rotation of jackscrews 64a and 66b results in raising or lowering of the upper platform 20 with respect to the lower platform 22. The rear jack assemblies 68 and 70 are substantially identical to the forward jack assemblies 64 and 66 and are likewise journalled to an upright rear bearing bracket 78.

Figure 2:
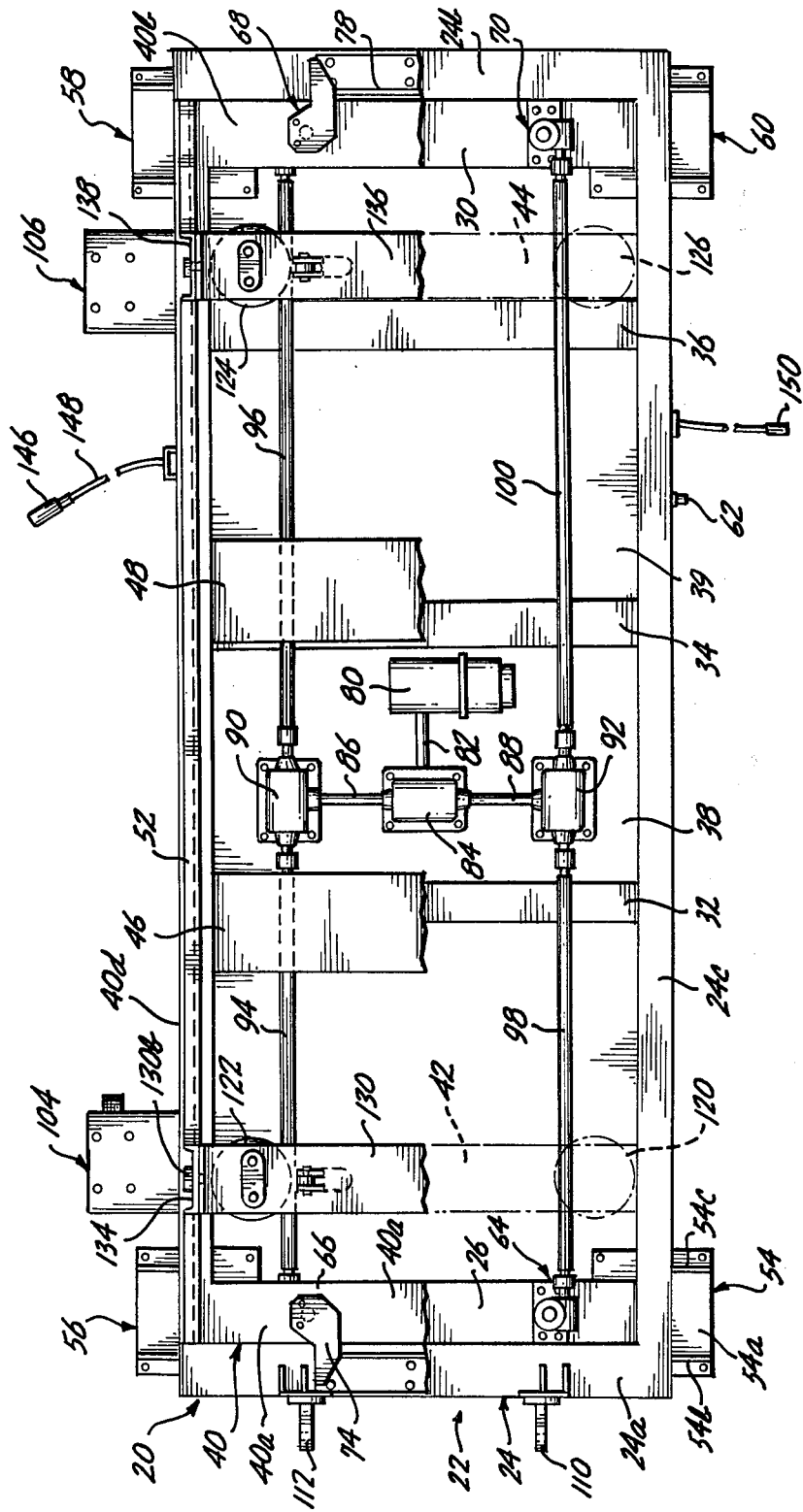
FIG. 2 is a top plan view of the lifting and positioning apparatus shown in FIG. 1 with a portion of the upper support platform removed to show details of the lower platform.
Figure 3:
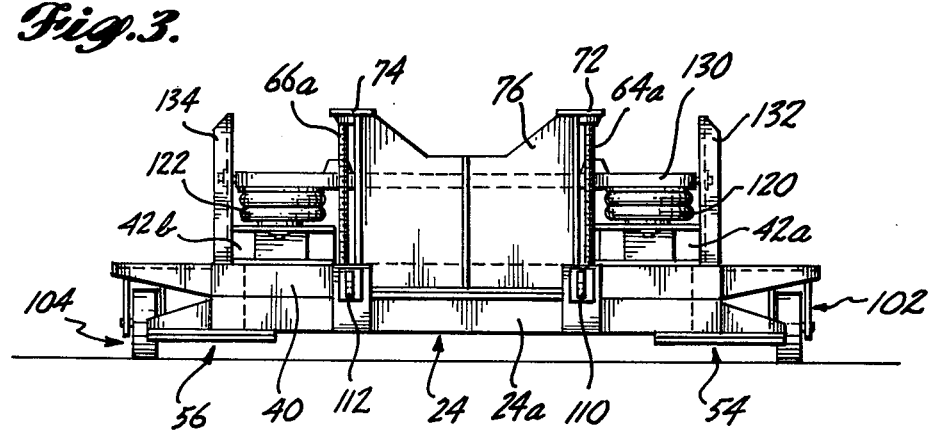
FIG. 3 is a front end view of the embodiment shown in FIG. 1.

Referring particularly to FIG. 2, the four jack assemblies are driven conjointly by a centrally located pneumatic drive motor 80 that is mounted on the mounting plate 38 of the lower platform 22. The drive motor 80 includes an output shaft 82 that is coupled to a mitre gearbox 84 also mounted on the mounting plate 38. The mitre gearbox 84 includes oppositely extending driveshafts 86 and 88 that extend transversely to the axis of the platform 22 and which are coupled to mitre gearboxes 90 and 92, respectively. The mitre gearbox 90 includes oppositely extending output shafts that are coupled to driveshafts 94 and 96. The driveshafts 94 and 96 are in turn coupled to the rack-and-pinion gearboxes of the jack assemblies 66 and 68, respectively. Likewise, the mitre gearbox 92 includes oppositely extending output shafts that are coupled to longitudinally extending driveshafts 98 and 100. The driveshaft 98 is coupled to the gearbox of the jack assembly 64, and the driveshaft 100 is coupled to the gearbox of the jack assembly 70. With the drive assembly just described, the single pneumatic motor 80 effectively actuates the four jack assemblies in unison so as to raise and lower the upper platform 20 while maintained in a substantially horizontal position.

The upper platform 20 includes a set of four caster wheel assemblies 102, 104, 106, and 108. The caster wheel assemblies 102 and 108 are affixed near the opposite ends of the frame section 40c, and the caster wheel assemblies 104 and 106 are affixed near the opposite ends of the frame section 40d. The forward caster wheel assemblies 102 and 104 are steerable, whereas the rear caster wheel assemblies 106 and 108 are nonsteerable. Referring particularly to the exemplary caster wheel assembly 102, there is a rigid gusseted mounting plate 102a that extends outwardly from the side of the frame section 40c. A swivel-mounted caster wheel fork 102b depends downwardly from the mounting plate 102a. A caster wheel 102c is journalled to the fork 102b. It will be noted that the caster wheel fork 102b depends downwardly a sufficient distance to allow the lower platform frame 24 to be withdrawn upwardly against the upper platform frame 40, so as to raise the air-cushion bearings, 56, 58, and 60 off the ground and allow the entire weight of the lifting apparatus 10 to bear on the caster wheels. Thus, it will be appreciated that the jack assemblies serve two purposes. During actual engine installation, the jack assemblies are used to raise the upper platform 20 with respect to the lower platform 22 while the lower platform 22 is supported on its air-cushion bearings. When the lifting and positioning apparatus 10 is to be transported a considerable distance, or over a surface that may not be sufficiently flat and smooth to accommodate the air-cushion bearings, the lower platform 22 may be withdrawn upwardly against the upper platform 20, such that the full weight of the apparatus is borne by the caster wheel assemblies for transport. In this regard, the lower platform 22 is provided with trailer hitches 110 and 112 with which the apparatus may be towed.

The upper platform 20 further includes a set of four expandable and contractible rubber elevator bellows 120, 122, 124, and 126, which may be selectively pressurized to exert upward lifting force in the manner of a pneumatic piston and cylinder assembly. The elevator bellows have a relatively large diameter, on the order of one foot, such that they are able to support a relatively heavy load while only moderately pressurized. Because of the moderate pneumatic pressures employed, and also because of the elastomeric nature of the rubber forming the bellows walls, the bellows form a resiliently cushioned, yieldable, lifting and positioning means for the aircraft engine 12 allowing the device to gently urge and maintain desired mounting position of the engine in all planes of rotation so as to avoid overloading of any mounting element or structural section.

The forward elevator bellows 120 and 122 are mounted on the opposite ends of the forward crossmember 42 of the frame 40. More specifically, the forward bellows 120 and 122 are mounted on box supports 42a and 42b, which are configured to accommodate a particular type of engine dolly 14. The air bellows 120 and 122 support a forward lift beam 130. The lift beam 130 travels up and down and is guided by a pair of guideposts 132 and 134 that extend upwardly from the side frame sections 40c and 40d of the upper platform 20. In this regard, the lift beam 130 includes guide bolts 130a and 130b that extend outwardly through vertical slots 132a and 134a formed in the guideposts 132 and 134.

The rear elevator bellows 124 and 126 are mounted on the crossmember 44 and support a lift beam 136. The lift beam 136 is guided by guideposts 138 and 140 in the same manner as the lift beam 130.

The lift beams 130 and 136 are secured against failure (i.e., bursting) of the elevator bellows by pairs of hydraulic arrestor rams 142 and 144, respectively. The arrestor rams 142 and 144 are safety devices that operate to prevent the lift beams from falling in the event an elevator bellows ruptures. More particularly, the arrestor rams are provided with flow-actuated valves, known as velocity fuses, which close and lock the ram in position in the event of rupture of an elevator bellows. The two arrestor rams 142 connect the forward lift beam 130 to the underlying crossbeam 142; and the two hydraulic rams 144 connect the rear lift beam 136 to the underlying crossbeam 44.

Operation of the elevator bellows and the jack assemblies is controlled from a control panel 146 mounted on a flexible conduit 148. The control panel 146 controls the metering of pressurized air to the elevator bellows in a conventional manner. An auxiliary deadman switch 150 is provided on a conduit located on the opposite side of the apparatus. In normal operation, positive actuation of both the control panel 146 and the deadman switch is required to operate the lifting apparatus, thereby ensuring that the apparatus is only operated while visually observed by operators on both sides of the engine.

In operation, the aircraft engine 12 is mounted on its associated wheeled dolly 14, which is in turn mounted on the lift beams 130 and 136 of the upper platform 20. With the lower platform 22 withdrawn upwardly against the upper platform 20, the entire assembly is towed into approximate position beneath the wing of the airplane. The jack assemblies are then actuated to deploy the lower platform 22 downwardly. When the lower platform 22 reaches the ground, weight load of the apparatus is transferred to the air-cushion bearings. Further actuation of the jack assemblies raises the upper platform 20, as well as the engine 12 and the dolly 14, until the engine 12 is within a few inches of its mounting position. The elevator bellows are then pressurized as required to orient the aircraft engine 12 in its correct angular orientation. In this regard, it will be noted that the elevator bellows can be used to rotate the engine 12 about its longitudinal axis and about a horizontal transverse axis. These rotations correspond, in aircraft parlance, to pitch and roll rotations. To enable the aircraft engine to be rotated about a vertical axis of rotation, or in a yaw direction, the air-cushion bearings are pressurized and the entire lifting and positioning apparatus 10 may be rotated manually. In this manner, the engine 12 can be rotated in three degrees of freedom to precisely orient it for mounting. Once the engine 12 is accurately oriented, either the elevator bellows or the screw-jacks may be actuated in unison to raise the engine the last few inches while maintained in its proper orientation. When the engine is in its mounting position, installation is completed by bolting the engine to the wing.

Although the present invention is described and illustrated herein with reference to a preferred embodiment, it will be understood that various modifications, alterations, and substitutions may be made without departing from the spirit of the invention. Accordingly, the scope of the invention is defined by the following claims.

The embodiments of the invention in which an exclusive property or privilege is claimed are defined as follows:

1. A lifting and positioning apparatus for stress-critical mounting of an object such as an aircraft engine, comprising:
   a first load-bearing support structure having fluid cushion bearing means for movably supporting said first support structure on a smooth ground surface;
   a second load-bearing support structure superposed on first structure, said second load-bearing support structure supporting a plurality of resiliently yieldable lifting means adapted to support and raise an object such as an aircraft engine at a plurality of locations distributed horizontally, said respective lifting means applying lift forces independently to the object and being independently actuatable to vary such lifting forces relatively, thereby to vary the angular orientation of said object to said support structure;
   downwardly depending wheel means affixed to said second structure; and,
   bi-directional jack means extending between said first and second load-bearing support structures, said jack means for raising and lowering said second load-bearing support structure, said bi-directional jack means being operable for selectively drawing said first structure and its associated fluid cushion bearings upwardly off the ground to support said apparatus on said wheel means.

2. The lifting and positioning apparatus defined in claim 1 wherein said wheel means of said second structure depend from arms that protrude outwardly from opposite elongate sides of said second support structure such that said first support structure may be drawn upwardly so as to be suspended beneath said second structure and between said wheel means.

3. The lifting and positioning apparatus defined in claim 2 wherein said first and second support structures each comprise generally rectangular first and second frames, respectively, said second frame being shorter in longitudinal dimension than said first frame and being positioned above said first frame, said first frame including at its opposite longitudinal ends upwardly extending jackscrew bearing supports, said jack means comprising forward and rear pairs of bidirectional screw-type jacks mounted at the opposite ends of said first frame, each screw-type jack including an upright threaded shaft journalled at its lower end in bearing means in said first frame and journalled at its upper end in said bearing supports, said threaded shafts passing through cooperably formed threaded bores formed in said second frame.

4. The lifting and positioning apparatus defined in claim 3, wherein said lifting means comprises a plurality of pneumatically pressurizable elastomeric elevator bellows, said bellows each being independently pressurizable to rotate said object to a desired orientation, and pressurizable in unison to raise said object while said object is maintained in a desired orientation.

5. The lifting and positioning apparatus defined in claim 4, wherein there are four elevator bellows arranged generally at the corners of a rectangle on said second structure, and further comprising a pair of transverse lift beams mounted on the pairs of bellows at the opposite ends of said second structure.

6. The lifting and positioning apparatus defined in claim 5, further comprising hydraulic arrestors interposed between said lift beams and said second support structure to arrest said beams in the event of failure of said elevator bellows.

* * * * *